(12) United States Patent
Tuomikoski et al.

(10) Patent No.: US 8,200,166 B2
(45) Date of Patent: Jun. 12, 2012

(54) DATA TRANSMISSION

(75) Inventors: Tuomo Tuomikoski, Oulunsalo (FI); Kari Autio, Oulu (FI); Iikka Mäkelä, Oulu (FI); Jukka-Pekka Nuutinen, Martinniemi (FI); Jouko Ryhänen, Oulu (FI); Juha Valtanen, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 1113 days.

(21) Appl. No.: 12/055,579

(22) Filed: Mar. 26, 2008

(65) Prior Publication Data

US 2009/0247090 A1 Oct. 1, 2009

(51) Int. Cl.
*H04B 1/00* (2006.01)
(52) U.S. Cl. .......... 455/70; 455/69; 455/7; 455/15; 370/208; 370/509
(58) Field of Classification Search .......... 455/70, 455/69, 7, 15; 370/208, 509
See application file for complete search history.

(56) References Cited

U.S. PATENT DOCUMENTS

| 7,164,650 B2 * | 1/2007 | Kim et al. ............ 370/208 |
| 2006/0010228 A1 | 1/2006 | Bodin et al. |
| 2006/0265384 A1 | 11/2006 | Lee et al. |
| 2007/0005795 A1 | 1/2007 | Gonzalez |
| 2007/0237090 A1 | 10/2007 | Kim et al. |
| 2008/0016176 A1 | 1/2008 | Leitner |

OTHER PUBLICATIONS

Shimizu, N. et al., "A Novel Decoder-Downloadable System for Content-Oriented Coding", IEEE Global Telecommunications Conference, Taipei, Conference Proceedings, p. 1638-1642 (2002).

* cited by examiner

*Primary Examiner* — Sanh Phu
(74) *Attorney, Agent, or Firm* — Hoffmann & Baron, LLP

(57) ABSTRACT

The transmitter receives information on a computing architecture of a receiver. A controller in the transmitter forms and transmits receiver-specific instructions based on data to be delivered and the information on the computing architecture. The controller in the receiver controls processing of the data on the basis of the instructions.

19 Claims, 3 Drawing Sheets

DATA TRANSMISSION

BACKGROUND OF THE INVENTION

1. Field of the Invention

The invention relates to data transmission and particularly to data streaming.

2. Description of the Related Art

Data streaming usually refers to a high data rate transmission of, for example, video or multimedia data. Data streaming may also be applied to a digital broadcasting transmission or some other massive data transfer from a server. In data streaming, the data transfer takes continuously place without an observable time lag.

Typically, the data streams are encoded by the server and the data stream is decoded by the client. However, processing of the received data stream is a complex task, and scheduling may even take up to 80% of the power and time of the operation of the processor in the client. Particularly, if the client is a handheld device, such as a mobile terminal, processing of the data stream may become a severe burden.

Some ways to mitigate the problem have been proposed and developed. Generally, the coding methods can be made easier for the client to decode the data stream. In a similar manner, computing architectures of the client have been developed in order to relieve scheduling. Also batteries for a portable client have been improved to feed power for the increased power consumption due to higher efficiency.

However, since the amount of data keeps increasing with the data rates and variety of encoding methods, the client faces an ever deteriorating situation with the processing of the data despite the known stages of development. Hence, the client is not able to achieve a good enough efficiency.

SUMMARY OF THE INVENTION

An object of the invention is to provide an improved data transmission method, an improved transmitter and an improved receiver. According to an aspect of the invention, there is provided a wireless data transmission method, the method comprising delivering data to a receiver; and delivering receiver-specific instructions to the receiver, the instructions controlling the receiver for processing the data.

According to another aspect of the invention, there is provided a wireless transmission method for delivering data, the method comprising generating receiver-specific instructions based on data to be delivered to the receiver and the information on the computing architecture of the receiver for controlling the receiver for processing the data; and delivering the data and the instructions to the receiver.

According to another aspect of the invention, there is provided a wireless transmission method for delivering data, the method comprising receiving, at the receiver, receiver-specific instructions based on data and the information on the computing architecture for controlling the receiver to process the data; and controlling, by the receiver, processing of the data on the basis of the instructions.

According to another aspect of the invention, there is provided a wireless transmission method for delivering data, the method comprising generating receiver-specific instructions based on data to be delivered to the receiver and the information on the computing architecture of the receiver for controlling the receiver to process the data; delivering the data and the instructions to the receiver; and controlling, by the receiver, processing of the data on the basis of the instructions.

According to another aspect of the invention, there is provided a transmitter in a wireless data transmission system, the transmitter being configured to deliver data to a receiver; and deliver receiver-specific instructions to the receiver, the instructions controlling the receiver to process the data.

According to another aspect of the invention, there is provided a transmitter for a wireless system, the transmitter being configured to generate receiver-specific instructions based on data to be delivered to the receiver and a computing architecture of the receiver for controlling the receiver during decoding the data; and deliver the data and the instructions to the receiver.

According to another aspect of the invention, there is provided a transmitter for a wireless transmission system, the transmitter comprising a controller for generating receiver-specific instructions based on a data to be delivered to the receiver and the information on the computing architecture of the receiver for controlling the receiver for processing the data; and the transmitter is configured to deliver the data and the instructions to the receiver.

According to another aspect of the invention, there is provided a receiver for a wireless transmission system, the receiver being configured to receive receiver-specific instructions based on data and the information on the computing architecture for controlling the receiver to process the data; and the receiver comprises a controller for controlling the data processing on the basis of the instructions.

According to another aspect of the invention, there is provided a wireless transmission system, the system comprising a transmitter and a receiver; the transmitter is configured to receive the information on the computing architecture, and the transmitter comprises a controller for generating receiver-specific instructions based on data to be delivered to the receiver and the information on the computing architecture of the receiver for controlling the receiver to process the data; the transmitter is configured to deliver the data and the instructions to the receiver; and the receiver comprises a controller for controlling the data processing on the basis of the instructions.

The invention provides several advantages. The receiver such as a client receives data with instructions such that the data stream from the transmitter can be properly processed in the receiver.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

Figure 1:
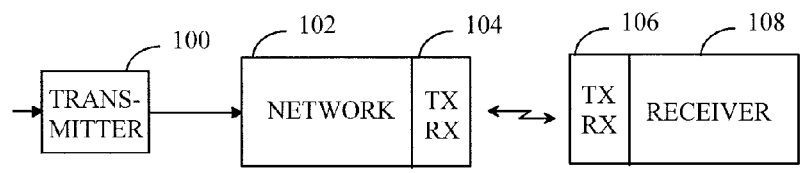
FIG. 1 shows a block diagram illustrating data transmission.

With reference to FIG. 1, examine an example of data transmission. A transmitter 100 may transfer data to a receiver 108 directly or indirectly. In an indirect case, the transmitter 100 may first feed the data to a network 102 which may include a radio transmitter 104 to pass the data wirelessly to a receiver 108 which has a radio receiver 106 for a connection to the network 104. In a direct case, the transmitter 100 of the data may have a radio transmitter for transmitting the data to the receiver 108 wirelessly without the network 102. In an embodiment, the transmitter 100 may deliver receiver-specific instructions for controlling the receiver 108 to process the transmitted data. The instructions may be delivered to the receiver 108 before, with or after the delivery of the data to be processed.

The transmitter and the receiver have a pre-agreed method to add the instructions to the data. The instructions may be transmitted separately outside the data or the instructions may be embedded into the data. The instructions may be presented as a field of a message, for example.

Figure 2:
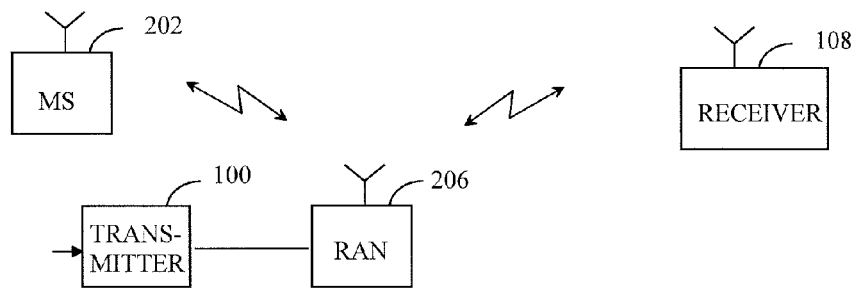
FIG. 2 illustrates a radio system.

As presented in FIG. 2, the transmitter 100 may be a computer or a computer program which may have a connection to a radio system or the transmitter 100 is a part of the radio system. The radio system may be a cellular radio system based on, for example, the GSM (Global System for Mobile Communications), UMTS (Universal Mobile Telephone System) or WCDMA (Wide-band Code Division Multiple Access). The transmitter 100 can pass data and instructions to a radio access network (RAN) 206, which may be in a similar role as the network 102 in FIG. 1. The RAN 206 may comprise a base station controller and a base station controlled by the base station controller. The RAN is, through the base station, in a wireless connection to several user terminals 108, 202, one of which is the receiver 108. Hence, data and instructions can be communicated between the transmitter 100 and the receiver 108 in the radio system.

The transmitter 100 may be a server and the receiver 108 may be a client according to a client-server-model. In general, a client, which may have a connection to a data network, may be a computer or a computer program which can receive data or a computer program, run an application and/or request a service from a server. The server, in turn, may be a computer program or a computer, which has a connection to the data network and which provides data or a computer program to the client.

The data transmitted by the transmitter 100 may be a data stream which may include, for example, multimedia information with or without a suitable computer program for showing the information to a user. A data stream is a format of digital data and the data stream may comprise sequences of data.

The transmitter 100 may deliver receiver-specific instructions which may control the receiver 108 to process the data. The instructions may be delivered to the receiver 108 before, with or after each sequence of the data.

Figure 3:
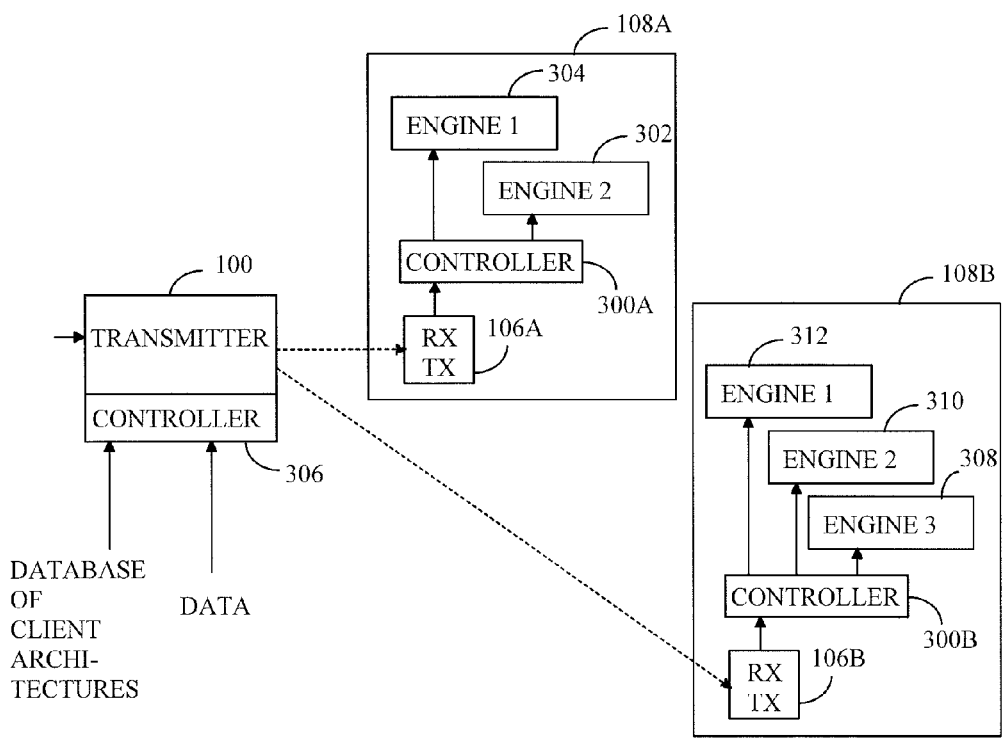
FIG. 3 illustrates the use of computing architecture according to the instructions.

Examine now FIG. 3 which illustrates the use of the architecture of the receiver 108 with respect to the processing of the received data. In general, computing architecture refers to the structure and the organization of hardware and programs in a computer. Hence, computing architecture defines the engines in the computer and all the computer programs that run on the computer. An engine, in turn, may be a computer program or hardware, such as an electric circuit, that performs a function which may be a part of a larger program.

A receiver 108A may have two engines 302, 304 for, for instance, decoding the received data. When some data and instructions have arrived in the radio receiver 106A, they are fed to a controller 300A for processing. The controller 300A interprets the received instructions and reads the data. After that the receiver uses its computing architecture according to the instructions.

A data sequence of a data stream may be processed by scheduling each sequence to enter or leave a predetermined processing engine. The scheduling may be based on the instructions received from the transmitter. Accordingly, the controller 300A may control the operation of decoding engines 302, 304 of the receiver with the instructions.

The controller 300A may control the timing of the decoding of a sequence of the data such that the decoding is performed at a moment defined in the receiver-specific instructions.

The controller 300A may control the use of the engines such that each sequence of the data is fed to a decoding engine which is defined suitable for the sequence in the receiver-specific instructions. Accordingly, the controller 300A may feed each sequence of the data to an engine 302, 304 defined in the instructions at a suitable moment based on the instructions.

The transmitter 100 may request the computing architecture from a receiver 108A, 108B. The receiver receives the request and transmits information on the computing architecture to the transmitter 100.

Alternatively or additionally, the transmitter 100 may identify the computing architecture by consulting a database in the RAN 206 having information on architecture of a plurality of receivers. The database may be, for instance, a home location registry in a cellular radio system.

The controller 306 of the transmitter 100 may also analyze the data to be delivered to the receiver 108A. The controller 306 may analyze, for example, a feature in the data having an impact on the optimization of the processing of the data in the receiver. A feature which may be analyzed may be a coding method of the data, a frame structure of a video stream etc. After the transmitter 100 receives the information on the computing architecture, the controller of the transmitter 100 may generate receiver-specific instructions for controlling the receiver 108A to process the data based on the data to be delivered to the receiver 108A and the computing architecture of the receiver 108A. The analysis and the generation of the instructions may be executed real-time "on the fly" when the data stream source (e.g. file) is opened and transmitted to the receiver. The controller 306 of the transmitter may define the engine which is selected for use at a certain moment or for a certain sequence. The engine may be selected, for example, on the basis of the known performance of the engine. The controller 306 has powerful processing capabilities to accomplish the analysis and the generation of the instructions.

Since the controller 306 may have the information on the parallel processing capabilities, special processing units etc. of the receiver, the controller 306 may form processing instructions optimized on the basis of selected factors.

The transmitter 100 may transmit data also to a receiver 108B. As already explained, the controller 306 of the transmitter 100 may analyze the data to be delivered to the receiver 108B. After the transmitter 100 receives the information on the computing architecture of the receiver 108B, the controller 306 of the transmitter 100 may generate receiver-specific instructions for controlling the receiver 108B to process the data based on the data to be delivered to the receiver 108B and the computing architecture of the receiver 108B. A receiver 108B may have three engines 308, 310, 312 for, for instance, decoding the received data. When some data and instructions have arrived the radio receiver 106B, they are fed to a controller 300B for processing. The controller 300B interprets the received instructions and reads the data. After that the receiver 108B uses its computing architecture according to the instructions. Accordingly, the controller 300B may feed each sequence of the data to an engine 308, 310, 312 defined in the instructions at a suitable moment based on the instructions.

An engine 308, 310, 312 may be, for example, a fine grain video decoder, a protocol interpreter, a speech signal decoder etc.

Accordingly, the received message may include both data and instructions. The data may include a decoded video stream and the instructions may define how to decode the video stream. As the transmitter knows the data it is transmitting and to whom it is transmitting, instructions associated with the data can be formed. With the instructions, the receiver avoids seeking a suitable decoding method and engines to do the decoding. Hence, power and time can be saved. In general, the number of operations in the receiver can be minimized.

Figure 4:
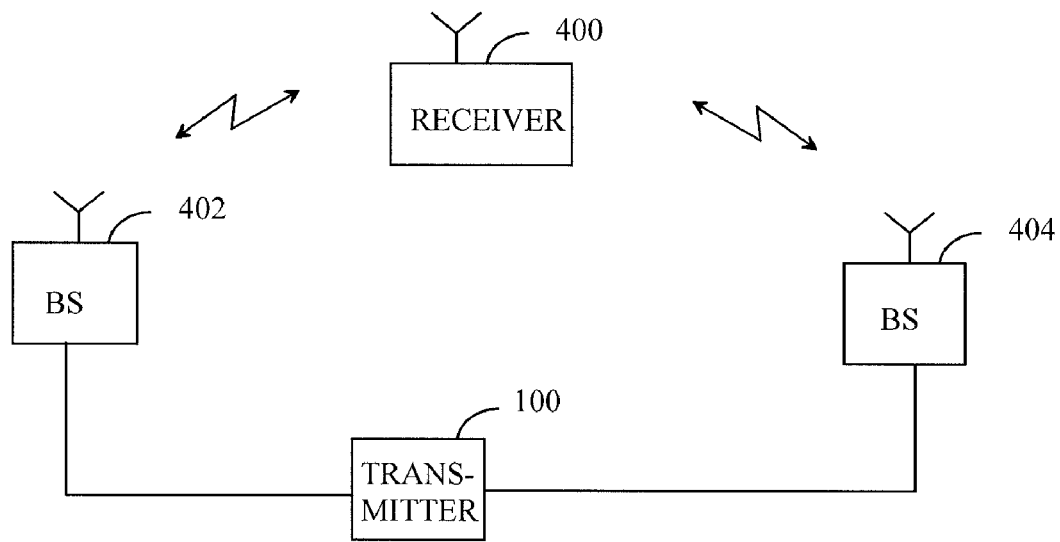
FIG. 4 illustrates a handover.

Examine now FIG. 4 which illustrates a handover in a radio system. When a user terminal 400 is a receiver 108 receiving a data stream and a handover from a base station 402 to a base station 404 is actual and possible, the handover may be controlled by the instructions from the transmitter 100. The transmitter 100 may receive information on the need of the handover before the handover is actually performed. The transmitter 100 may transmit an instruction ordering the user terminal 400 to postpone or advance the handover until the data transfer is over. The transmitter 100 may also instruct the receiver to postpone the handover until a certain moment or a certain data sequence defined by the transmitter 100 in the instructions. However, if the quality of the wireless transmission between the base station 402 and the user terminal 400 becomes worse than a threshold, the handover may be performed irrespective of the instructions from the transmitter 100.

Figure 5:
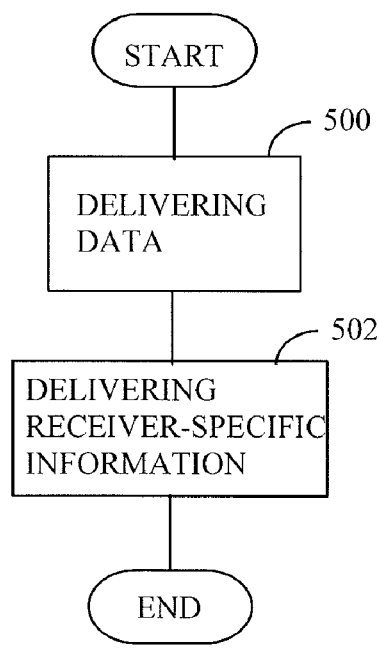
FIG. 5 illustrates a general flow chart of the method.

FIG. 5 presents a general flow chart of the method of wireless data transmission. In step 500, data is delivered to a receiver. In step 502, receiver-specific instructions are delivered to the receiver, the instructions controlling the receiver for processing the data.

Figure 6:
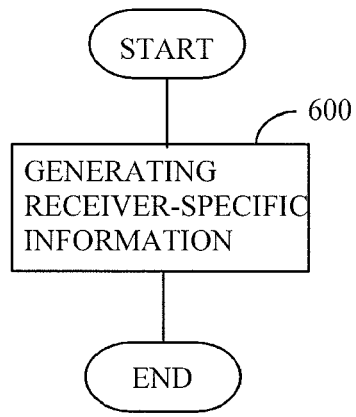
FIG. 6 presents a flow chart of the method of forming the instructions.

FIG. 6 presents a flow chart of the method of forming the instructions. In step 600 receiver-specific instructions are generated based on a data to be delivered to the receiver and a computing architecture of the receiver for controlling the receiver during decoding the data.

Figure 7:
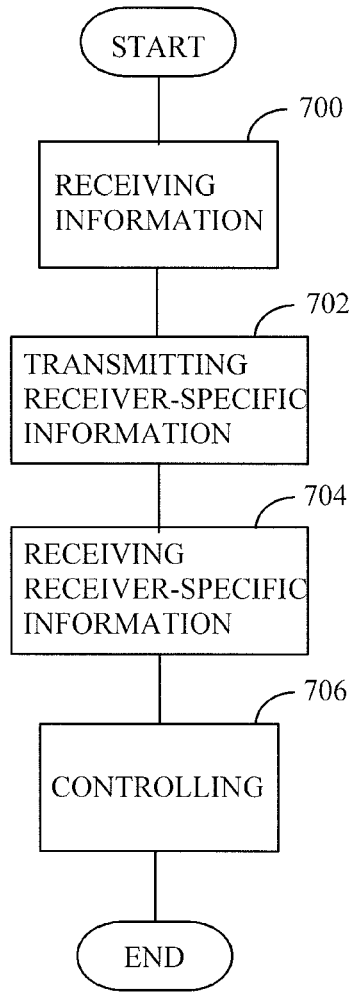
FIG. 7 presents a flow chart of communication between the transmitter and the receiver.

FIG. 7 presents a flow chart of communication between the transmitter and the receiver. In step 700, the transmitter receives information on the computing architecture. In step 702, the transmitter transmits the receiver-specific instructions based on a data and the information on the computing architecture for controlling the receiver to process the data. In step 704, the receiver receives the receiver-specific instructions. In step 706, the receiver controls processing of the data on the basis of the instructions.

Even though the invention has been described above with reference to an example according to the accompanying drawings, it is clear that the invention is not restricted thereto but it can be modified in several ways within the scope of the appended claims.

What is claimed is:

1. A wireless transmission method for delivering data, the method comprising:

transmitting, at a transmitter configured to receive information associated with computing architecture of a receiver, receiver-specific instructions based on data to be delivered to the receiver and information associated with computing architecture of the receiver to control the receiver during processing of the data, the transmitter being configured to deliver the data and receiver-specific instructions to the receiver;

receiving, at the receiver, the data and receiver-specific instructions based on information representing computing architecture of the receiver to control the receiver during processing of the data, the receiver being configured to input the data to a decoding engine associated with the receiver, the decoding engine being defined in the receiver-specific instructions; and controlling, by the receiver, processing of the data on the basis of the receiver-specific instructions.

2. The method of claim 1, the method further comprising processing including controlling the operation of decoding engines of the receiver by the instructions.

3. The method of claim 2, the method further comprising decoding a sequence of the data at a moment defined in the receiver-specific instructions.

4. The method of claim 2, the method further comprising inputting each sequence of the data to a receiver's decoding engine defined in the receiver-specific instructions.

5. The method of claim 4, the method further comprising decoding each sequence of the data by a receiver's decoding engine defined in the receiver-specific instructions, the engine being defined on the basis of the performance of the engine.

6. The method of claim 1, the method further comprising receiving data stream by a user terminal as the receiver and controlling a handover of the user terminal by the instructions during data reception.

7. The method of claim 1, the method further comprising receiving, by a receiver, a request of a computing architecture of a receiver; and transmitting information on the computing architecture from the receiver.

8. A receiver for a wireless transmission system, the receiver being configured to receive data and receiver-specific instructions from a transmitter based on information representing computing architecture of the receiver to control the receiver during processing of the data, the receiver being configured to input the data to a decoding engine associated with the receiver, the decoding engine being defined in the receiver-specific instructions, the receiver comprising a controller to control processing of the data on the basis of the receiver-specific instructions.

9. The receiver of claim 8, the receiver being further configured to receive a data stream and receiver-specific instructions with the data stream from the transmitter.

10. The receiver of claim 8, the instructions including definition about an engine for a sequence of data on the basis of the performance of the engine.

11. The receiver of claim 8, the receiver being further configured to receive a request of a computing architecture of a receiver from a transmitter; and to transmit information on the computing architecture to a transmitter.

12. A wireless transmission system, the system comprising a transmitter; and a receiver, the transmitter being configured to receive information associated with computing architecture of the receiver, the transmitter comprising a controller to generate receiver-specific instructions based on data to be delivered to the receiver and the information associated with computing architecture of the receiver to control the receiver during processing of the data, the transmitter being configured to deliver the data and receiver-specific instructions to the receiver, the receiver being configured to receive the data and receiver-specific instructions based on information representing computing architecture of the receiver to control the receiver during processing of the data, the receiver being configured to input the data to a decoding engine associated with the receiver, the decoding engine being defined in the receiver-specific instructions, the receiver comprising a controller for controlling the data processing on the basis of the receiver-specific instructions.

13. The system of claim 12, wherein the receiver comprises decoding engines and the processing includes controlling of the operation of decoding engines of the receiver by the instructions.

14. The system of claim 12, wherein each decoding engine is configured to decode a sequence of the data at a moment defined in the receiver-specific instructions.

15. The system of claim 12, wherein the receiver is configured to input each sequence of the data to a receiver's decoding engine defined in the receiver-specific instructions.

16. The system of claim 12, wherein the transmitter is configured to define an engine for a sequence of data on the basis of the performance of the engine.

17. The system of claim 12, wherein the transmitter being configured to request a computing architecture from a radio access network;
the radio access network is configured to transmit information on the computing architecture as a response to the request.

18. The system of claim 12, wherein the transmitter being configured to request a computing architecture from a receiver;
the receiver is configured to transmit information on the computing architecture as a response to the request.

19. The system of claim 12, wherein the receiver is a user terminal in a radio system and a handover of the user terminal is controlled by the instructions during data reception.

\* \* \* \* \*